(12) United States Patent
Kamohara

(10) Patent No.: US 7,974,163 B2
(45) Date of Patent: Jul. 5, 2011

(54) OPTICAL DISK DEVICE

(75) Inventor: Satoshi Kamohara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 570 days.

(21) Appl. No.: 12/108,081

(22) Filed: Apr. 23, 2008

(65) Prior Publication Data

US 2008/0267026 A1  Oct. 30, 2008

(30) Foreign Application Priority Data

Apr. 25, 2007  (JP) .................................. 2007-115029

(51) Int. Cl.
*G11B 5/09* (2006.01)
(52) U.S. Cl. ............... 369/47.31; 369/47.22; 369/47.47; 369/47.54
(58) Field of Classification Search ............... 369/47.22, 369/47.27, 47.31, 47.47, 47.54, 59.25
See application file for complete search history.

(56) References Cited

FOREIGN PATENT DOCUMENTS

| JP | 2002-008318 A | 1/2002 |
|---|---|---|
| JP | 2002150691 | 5/2002 |
| JP | 2004-194215 | 7/2004 |
| JP | 2004-213762 | 7/2004 |
| JP | 2004194215 A * | 7/2004 |
| JP | 2004213762 A * | 7/2004 |
| JP | 2005-346781 A | 12/2005 |
| JP | 2006-106167 A | 4/2006 |
| JP | 2006-190362 | 7/2006 |
| JP | 2006190362 A * | 7/2006 |
| JP | 2007/095121 | 4/2007 |
| JP | 2007095121 A * | 4/2007 |

OTHER PUBLICATIONS

Japanese Office Action dated Mar. 10, 2009 for Appln. No. 2007-115029.
Japanese Office Action dated Jun. 2, 2009 for Appln. No. 2007-115029.

* cited by examiner

*Primary Examiner* — Wayne R Young
*Assistant Examiner* — Brenda Bernardi
(74) *Attorney, Agent, or Firm* — Pillsbury Winthrop Shaw Pittman, LLP

(57) ABSTRACT

This optical disk device includes a read means which reads data from an optical disk upon which data is recorded at a variable bit rate for each sector. Moreover, this optical disk device includes a buffer memory which sequentially stores data which has been read by the read means, and a replay means which sequentially reads out and decodes data stored in the buffer memory, and replays that data. Furthermore, this optical disk device includes a control means which, when a command for special replay is issued, calculates the address of the sector currently being decoded by the replay means based upon the address of the sector currently being read by the read means, and upon the amount of data stored in the buffer memory. And the control means commands the read means to read out, from the optical disk, a sector to be jumped to.

5 Claims, 4 Drawing Sheets

OPTICAL DISK DEVICE

CROSS REFERENCE

This Nonprovisional application claims priority under 35 U.S.C. §119(a) on Patent Application No. 2007-115029 filed in Japan on Apr. 25, 2007, the entire contents of which are hereby incorporated by reference.

BACKGROUND OF THE INVENTION

The present invention relates to an optical disk device which can read and replay data from an optical disk upon which data is recorded at a variable bit rate for each sector.

Super Video CDs (hereinafter "SVCDs") are a type of media package distributed in various Asian countries. AV data (an MPEG program stream) is recorded upon an SVCD sector by sector, encoded using the MPEG2 (Moving Picture Experts Group 2) method, which is a variable bit rate compression encoding method.

An optical disk device which replays this type of media package is provided with a function for displaying, during the replay of AV data, a replay elapsed time which corresponds to the current replay position. This replay elapsed time is the time period which would be required for normal replaying of the AV data from its start to the present replay position. The correlation relationship between this replay elapsed time and the address of the sector which is currently being replayed will now be described in detail in the following.

First, as a preliminary, the correlation relationship between the address of the sector which is currently being read and the address of the sector which is currently being replayed will be explained. While reading out of AV data upon an optical disk is being performed, generally pre-read processing is performed. This pre-read processing is processing for reading out in advance, from the optical disk, AV data subsequent to the address where the AV data that is currently being replayed is located, and for storing this data in a buffer memory. This AV data which has been temporarily stored in the buffer memory is subsequently sequentially decoded and replayed. Here, the buffer memory is provided in order to prevent underflow of the AV data occurring (underflow may be caused by the decoding processing). And, due to the delay in this buffer memory, the address of the sector which is currently being replayed and the address of the sector which is currently being read come to be different. Because of this, the correlation relationship between the address of the sector which is currently being read and the address of the sector which is currently being replayed is indeterminate.

Next, with a Video CD upon which AV data has been encoded according to MPEG1, since MPEG1 has a fixed bit rate, the replay elapsed time and the address of the sector which is currently being replayed correspond one-to-one. Due to this, even though there is a delay time due to the buffer memory described above, still the optical disk device is able to ascertain the address of the sector which is currently being replayed accurately from the replay elapsed time, in a simple and easy manner. Because of this fact, in MPEG1, if a command for fast forward is issued, fast forwarding can be easily executed by taking the address of the sector which is currently being replayed as a starting point. Similarly, if a command for fast reverse is issued, fast reversing can be easily executed by taking the address of the sector which is currently being replayed as a starting point. Here, fast forward means a fast replay at high speed where the replay speed is higher than that of normal replay. Moreover, fast reverse means a fast replay at high speed in the opposite direction to the direction in which normal replay is performed, and moreover where the replay speed is higher than that of normal replay. Hereinafter, the term "special replay" will be used generically for fast forward replay, for slow forward replay, or for reverse replay.

It should be understood that, in Japanese Laid-Open Patent Publication 2002-150691, a replay device is proposed which calculates the replay elapsed time and the remaining time for replay.

However, with an SVCD upon which AV data encoded according to MPEG2 is recorded, the data is recorded at a variable bit rate. Due to this, the replay elapsed time and the address of the sector which is currently being replayed do not correspond one-to-one. In other words, the correlation relationship between the replay elapsed time and the address of the sector which is currently being replayed is indeterminate.

Because of this fact, with a prior art optical disk device, it has not been possible to know the address of the sector which is currently being replayed. Thus, with a prior art optical disk device, if a command is issued for some type of special replay such as fast forward or fast reverse or the like, it has not been possible to determine an appropriate starting point, since the address of the sector which is currently being replayed, which should be the starting point, is not known. Because of this problem, with a prior art optical disk device, irrespective of whether the user has issued, for example, a fast reverse command, it sometimes happens that data which is temporally subsequent to the point which is currently being replayed, is replayed, which is undesirable. Accordingly, with a prior art optical disk device, when special replay of some such type is to be performed, the user has sometimes experienced an undesirable sense of discomfort.

Thus, the object of the present invention is to provide an optical disk device which can execute special replay by accurately calculating the address of the sector which is currently being replayed, so that the reliability when performing such special replay is enhanced.

SUMMARY OF THE INVENTION

The optical disk device according to the present invention includes a read means which reads data from an optical disk upon which data is recorded at a variable bit rate for each sector. This optical disk may be, for example, a Blu-ray disk, a DVD (Digital Versatile Disk), or a SVCD. And storage positions of the sectors are specified by addresses upon the optical disk.

Moreover, this optical disk device includes a buffer memory which sequentially stores data which has been read by the read means, and a replay means which sequentially reads out and decodes data stored in the buffer memory, and replays that data. With this structure, during replay, this optical disk device performs pre-read processing in a manner which is per se similar to that of a conventional optical disk device.

Furthermore, this optical disk device includes a control means which, when a command for special replay is issued, calculates the address of the sector currently being decoded by the replay means based upon the address of the sector currently being read by the read means, and upon the amount of data stored in the buffer memory. Such special replay is replay at a special replay speed which is different from the speed of standard replay. With this structure, during replay, the user may issue a command for such special replay. Moreover, the speed for such special replay may be set by the user.

And the control means commands the read means to read out from the optical disk a sector to be jumped to. Here, this sector to be jumped to is the sector which is at an address displaced, from the address of the sector currently being decoded, by a jump over time period which corresponds to the special replay speed. By doing this, a sector to be jumped to is replayed based upon the address of the sector currently being decoded which has been accurately calculated.

DETAILED DESCRIPTION OF THE INVENTION

In the following, an optical disk device which is an embodiment of the present invention will be explained.

Figure 1:
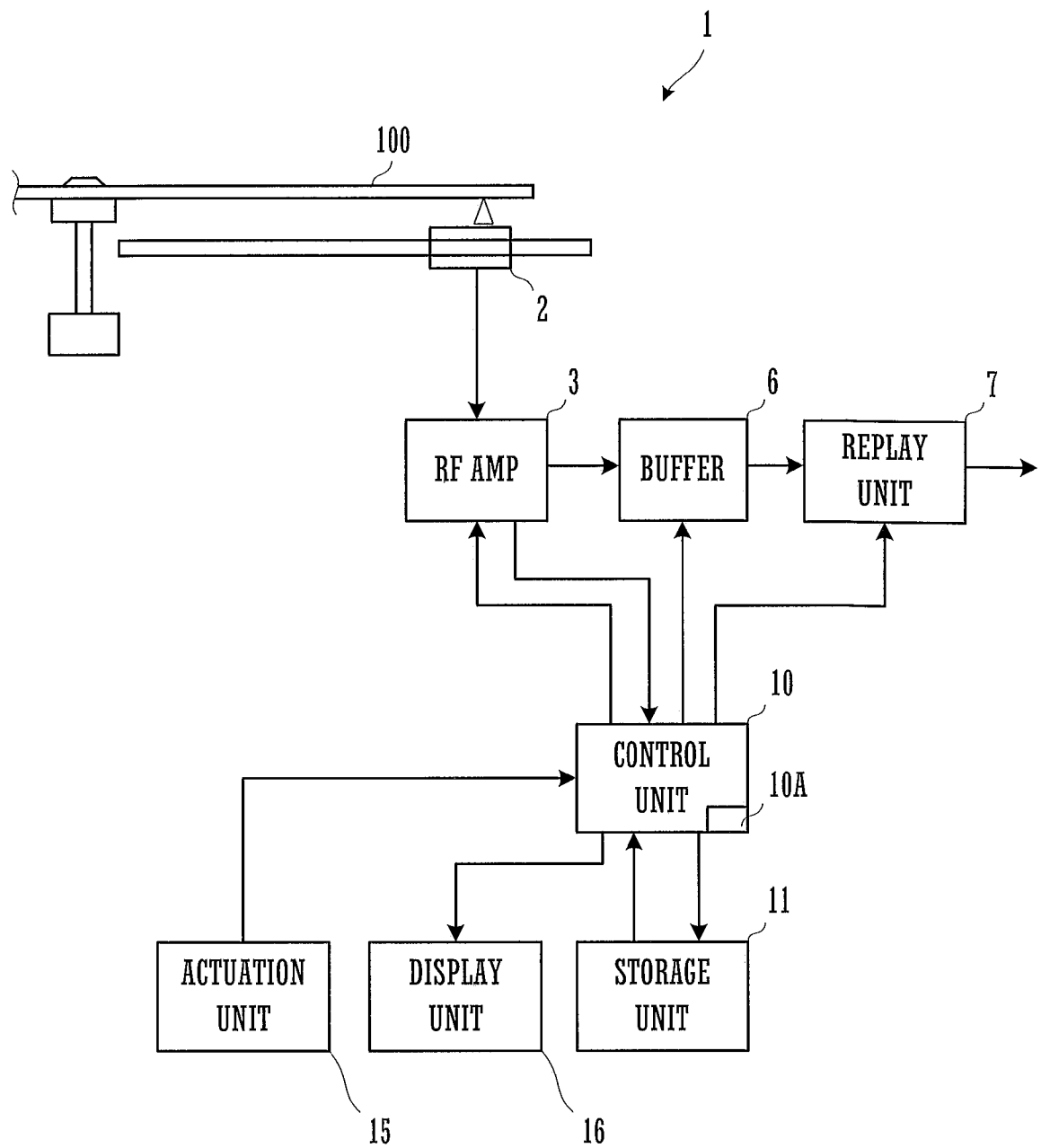
FIG. 1 is a block diagram showing the structure of the main portion of an optical disk device which is an embodiment of the present invention.

FIG. 1 is a block diagram showing the structure of the main portion of an optical disk device which is an embodiment of the present invention. The optical disk device 1 comprises a control unit 10 which controls the operation of the various sections of the optical disk device 1, a pickup head 2 (hereinafter termed the "PU head 2") which irradiates laser light upon the optical disk 100 and detects light reflected therefrom, an RF amp 3 which generates an RF signal from the reflected light and thereby acquires data, a buffer RAM 6 which temporarily stores this data, a replay unit 7 which sequentially reads out and decodes data from the buffer RAM 6 and generates a replay signal and outputs it to the exterior of the optical disk device 10, an actuation unit 15 which receives actuation input by the user, and a display unit 16 which displays the operational state of the optical disk device 1 and the like.

This optical disk device 1 is a so called SVCD player. Moreover, the optical disk 100 is a DVD (Digital Versatile Disk) SVCD.

It should be understood that the PU head 2 and the RF amp 3 correspond to the "read means" of the Claims. Moreover, the buffer RAM 6 corresponds to the "buffer memory" of the Claims. Furthermore, the replay unit 7 corresponds to the "replay means" of the Claims.

The storage unit 11 may, for example, be built from an EEPROM. The storage unit 11 contains a control program which specifies a control method for controlling the operation of the various sections of the optical disk device 1.

The control unit 10 may, for example, be built from a microcomputer. The control unit 10 includes a RAM 10A which serves as a working space for holding data processed by the control program described above.

The display unit 16 may, for example, be built from an LCD (Liquid Crystal Display). The display unit 16 displays information which shows the current time, the operational state of the optical disk device 1, information related to the data which is being replayed, and the like.

The PU head 2 comprises a laser diode (LD), a collimator lens, a beam splitter, an objective lens, a photodetector, a thread motor, and an actuator, none of which is shown in the figures.

The PU head 2 is freely shiftably fitted upon a shaft which extends in the radial direction of the optical disk 100. And the thread motor shifts the PU head 2 in the radial direction of the optical disk 100.

The LD is a light source which outputs laser light. The photodetector is formed from a plurality of light reception elements, and detects light reflected from the optical disk 100.

Now, the operation during replay will be explained in the following.

The PU head 2 irradiates laser light of read power upon the optical disk 100, and detects the light reflected back from the optical disk 100 with the photodetector. By doing this, the optical disk device 1 reads out the data recorded upon the optical disk 100 optically.

Figure 2:
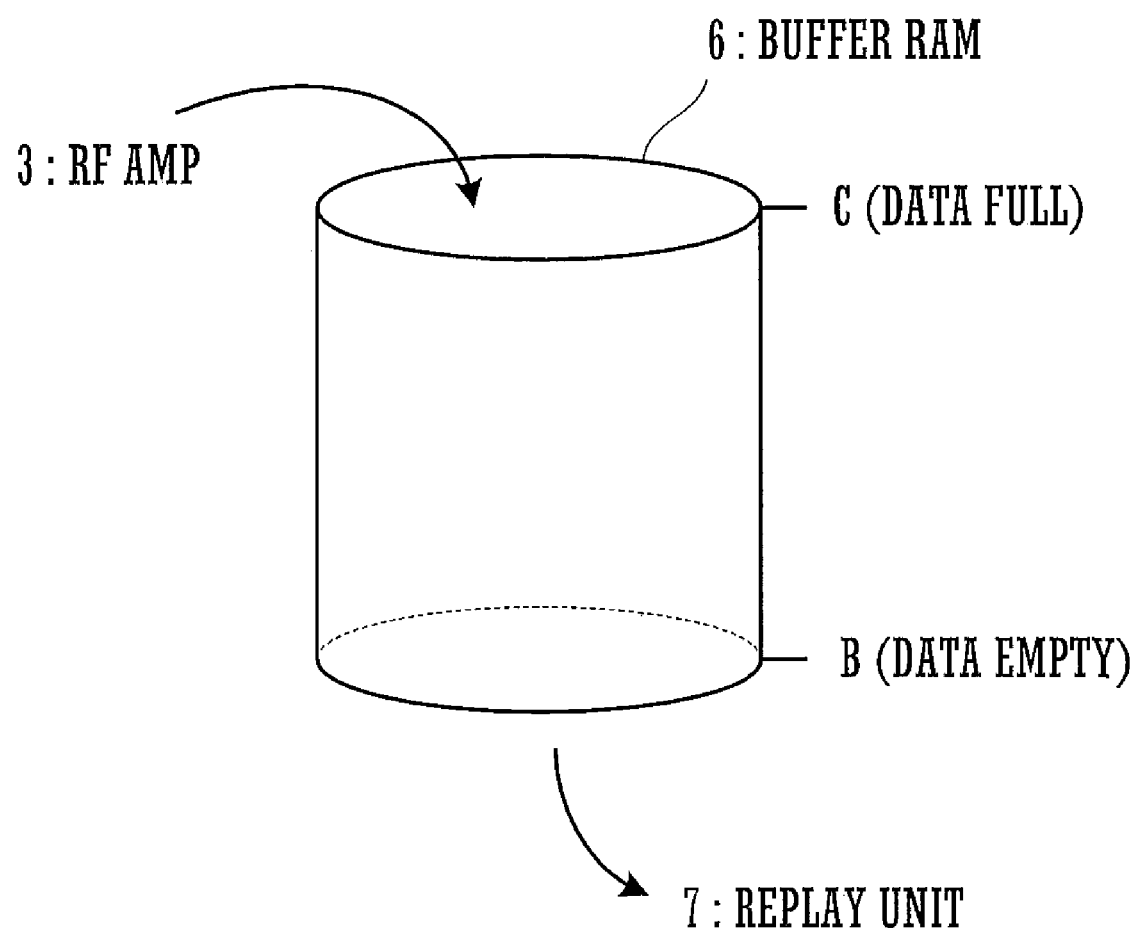
FIG. 2 is a figure showing how data is stored in a buffer RAM 6.

FIG. 2 shows the way in which data is stored in the buffer RAM 6.

The RF amp 3 generates an RF signal based upon the light which is reflected from the optical disk 100 and detected by the photodetector. The RF signal is a read signal for the data which is recorded upon the optical disk 100. And the RF amp 3 amplifies this RF signal, processes this RF signal, and extracts video data and audio data therefrom. Here, the data which is extracted is, for example, encoded by MPEG2. Finally, the RF amp 3 sequentially stores the extracted video and audio data in the buffer RAM 6. The buffer RAM 6 is a memory which is provided for preventing occurrence of data underflow due to decoding processing by a decoder housed within the replay unit 7 (such underflow may occur due to the decoding processing). Here, when reading of data upon the optical disk is being performed, the optical disk device 1 also performs pre-read processing. This pre-read processing is processing for reading out data subsequent to the address where the data that is currently being replayed is located, and for storing this data in the buffer RAM 6.

The replay unit 7 includes a decoder (not shown in the figures) which sequentially reads out the data stored in the buffer RAM 6 and decodes it. The replay unit 7 generates a replay signal from this data after it has been decoded, and outputs the replay signal to the exterior of the optical disk device 1. For example, a liquid crystal monitor and a speaker may be connected to the optical disk device 1. The relay signal which is outputted is processed by the liquid crystal monitor and the speaker or the like, and thereby the contents stored upon the optical disk 100 is replayed. Due to this, the user is able to view and listen to the video and audio contents stored upon the optical disk 100 via the liquid crystal monitor and the speaker or the like.

A plurality of keys which receive actuation input by the user are provided to the actuation unit 15. The actuation unit 15 transmits to the control unit 10 signals which correspond to the keys which are actuated.

The above described plurality of keys includes a fast forward key for commanding high speed replay at a replay speed which is quicker than the normal replay speed, and a fast reverse key for commanding replay in the opposite direction to the normal direction of replay and likewise at a replay speed which is quicker than the normal replay speed.

The user may depress the fast forward key during replay, to replay the optical disk 100 at any desired high replay speed. Moreover, the user may depress the fast reverse key during replay, to replay the optical disk 100 in the reverse direction at any desired high replay speed.

The relationship between the speed of such special replay and the number of times the key is depressed, for both fast forward and fast reverse, is that the time period X of the original contents (in seconds) from which one frame is to be extracted during high speed replay=0.5× the number of times the corresponding key has been depressed. For example, if the user has depressed the fast forward key three times, then high speed replay takes place at the rate of one frame extracted from each 1.5 seconds of the original contents.

Figure 3:
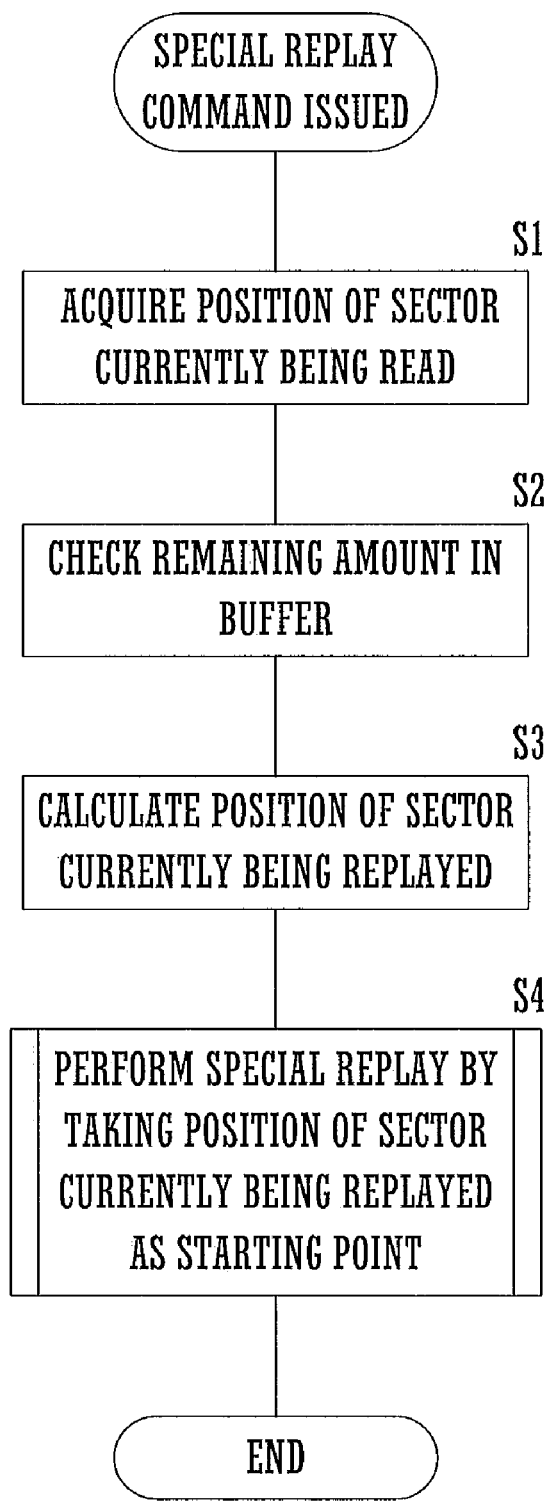
FIG. 3 is a flow chart showing the operation performed by a control unit of this optical disk device which is an embodiment of the present invention, when a command is issued for special replay.

FIG. 3 is a flow chart showing the operation which is performed when the control unit of the optical disk device which is an embodiment of the present invention issues a command for special replay. This operation is performed when, during replay, the user depresses the fast forward key or the fast reverse key.

When the fast forward key or the fast reverse key is depressed during replay, the control unit 10 acquires, via the RF amp 3, the address of the sector which is currently being read by the PU head 2 (a step S1). Here, to each sector upon the optical disk 100, an address intrinsic to the sector is allocated in advance. In this step S1, by reading the address of the sector which is currently being read by the PU head 2, the control unit 10 determines at which sector the position of irradiation of the laser light upon the optical disk 100 is located.

Next, the control unit 10 checks the amount of data stored in the buffer RAM 6 (a step S2).

And, based upon the address of the sector which is being read by the PU head 2 and the amount of data stored in the buffer RAM 6, the control unit 10 calculates (a step S3) the address of the sector which is currently being decoded by the replay unit 7 as the address of the sector which is currently being replayed. For example, if the address of the sector which is currently being read (in sectors) is X, the amount of data stored in the buffer RAM 6 (in bytes) is Y, the amount of data per one sector (i.e. the number of bytes per sector) is S, and the address of the sector which is currently being decoded (in sectors) is Z, then the control unit 10 calculates the address of the sector which is currently being decoded as the address of the sector which is currently being replayed, according to the equation "Z=X−(Y/S)". Here, there is almost no error in the address of the sector which is currently being decoded and in the address of the sector which is currently being replayed, since, after being decoded, the data is immediately outputted by the replay unit 7 as the replay signal. Due to this, in the step S3, it is possible accurately to calculate the address of the sector which is currently being replayed. And, because of this, it is possible accurately to determine the starting point to be used in a step S4 to be described hereinafter.

It should be understood that, in this embodiment, S (i.e. the number of bytes/sector)=2048.

The control unit 10 further performs fast forward or fast reverse (a step S4) by taking, as starting point, the address of the sector which is currently being replayed (i.e. the address of the sector which is currently being decoded) which has thus been calculated, and then this processing terminates.

By the above, it is possible to set the address of the sector which is currently being replayed as an accurate starting point. Due to this, in the step S12 which will be described hereinafter, it is possible to prevent any sector temporally subsequent to the sector which is currently being replayed from undesirably being replayed, even though the user has, for example, issued the fast reverse command. Accordingly, it is possible to enhance the reliability when performing fast forward or fast reverse.

Figure 4:
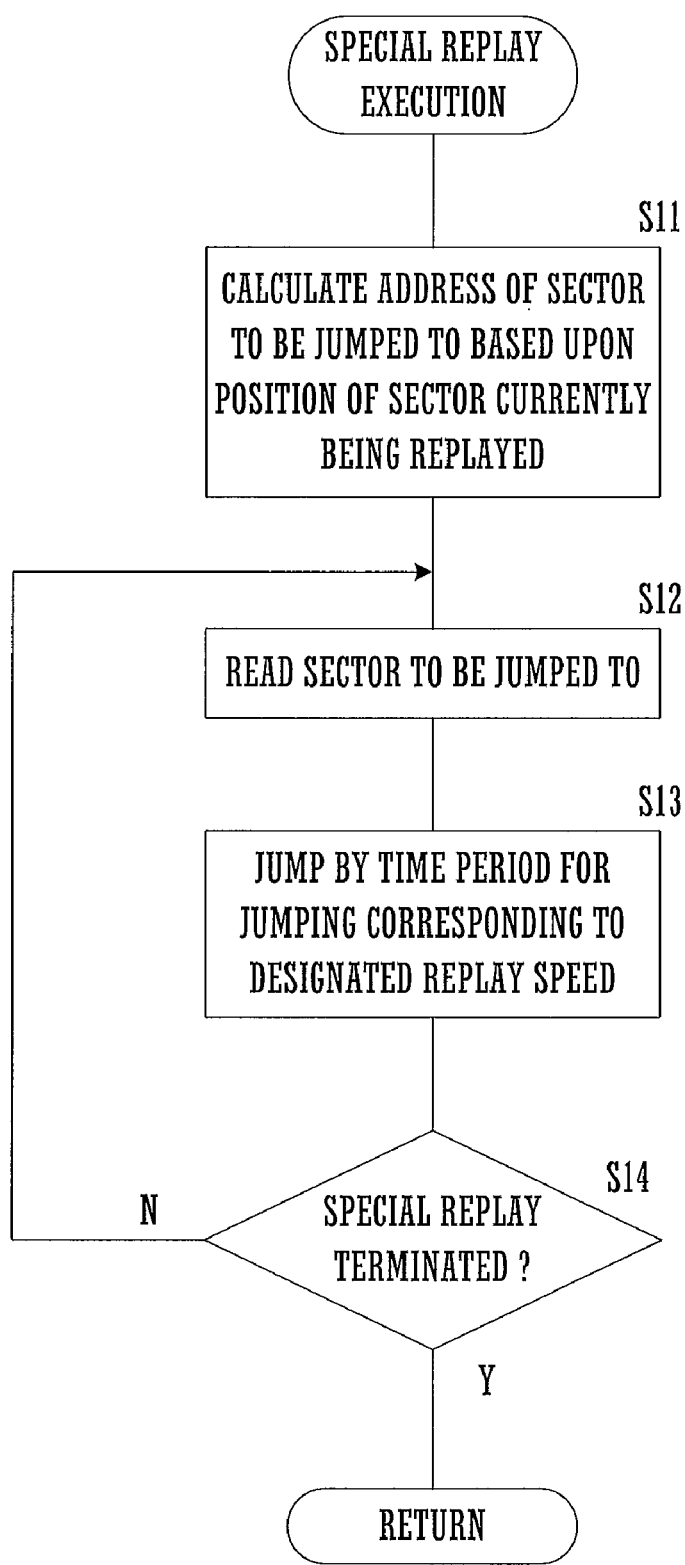
FIG. 4 is a flow chart showing the operation performed by a control unit of this optical disk device which is an embodiment of the present invention, during such special replay.

FIG. 4 is a flow chart showing the operation which the control unit of the optical disk device according to this embodiment of the present invention performs during special replay.

When performing fast forward or fast reverse in the step S4, based upon the address of the sector currently being replayed which has been calculated (i.e. the address of the sector which is currently being decoded), the control unit 10 calculates (a step S11) the address of the sector to be jumped to, i.e. of the sector which is to be jumped to from the sector currently being decoded. This sector to be jumped to is the sector which is designated as the next sector to be read (the next sector to be jumped to) during this special replay. The jumping over time period varies according to the replay speed which has been designated with the fast forward key or the fast reverse key. For example, if the user has depressed the fast forward key three times, then, since high speed replay with 1.5 seconds jumping over has thereby been designated, the sector positioned 1.5 seconds forward from the sector currently being replayed becomes the sector to be jumped to.

And the control unit 10 commands the PU head 2 (a step S12) to read from the optical disk 100 the sector to be jumped to, which is present at the address for the sector to be jumped to which has thus been calculated. By doing this, the sector to be jumped to is replayed.

By doing as described above, it is possible to calculate an accurate address for the sector to be jumped to in the step S11, by taking the accurate address of the sector which is currently being replayed as the starting point. Accordingly, it is possible to replay the accurate sector to be jumped to in the step S12.

It should be understood that the control unit 10 then further jumps, from this sector to be jumped to which has been read, by the number of frames corresponding to another jump over time period (for example to the 1.5 seconds described above), according to the designated replay speed (a step S13). And the control unit 10 repeats the processing of the steps S12 and S13 for reading the sector which has been jumped to and then jumping forward to the next sector to be jumped to, until a command is issued for the ending of the fast forward or fast reverse process (a step S14). By doing this, the fast forward or fast reverse process is performed. And, when a command is issued for the ending of the fast forward or fast reverse process (the step S14), the control unit 10 ends this subroutine and returns to the main routine.

Furthermore, the following variant embodiments of this embodiment of the present invention may be employed.

The replay unit 7 may be endowed with a function of detecting the bit rate of the data which is being decoded. And, before the step S11 of FIG. 4, the control unit 10 may acquire the bit rate of the data which is being decoded from the replay unit 7.

And in this case, in the step S11 of FIG. 4, the control unit 10 calculates the address of the sector to be jumped to, based upon the bit rate of the data currently being decoded which has thus been acquired, the time period to be jumped over which corresponds to the replay speed designated for special replay, and the address of the sector currently being decoded which has been calculated. To describe this in detail, the control unit 10 calculates the address of the sector to be jumped to according to the equation "Q=(P×T)/(S+Z)", where P (in bits) is the bit rate of the data which is currently being decoded, T (in seconds) is the time period to be jumped over, S (in bytes per sector) is the amount of data in each sector, Z (in sectors) is the address of the sector which is being decoded, and Q (in sectors) is the address of the sector to be jumped to. The shorter is the time period to be jumped over, in other words the closer the replay speed is to the normal speed, the more is it possible to ignore the amount of change in the bit rate. Thus, the address of the sector to be jumped to is calculated according to the equation "Q=(P×T)/(S+Z)" described above.

By doing as described above, if the replay speed which is designated is close to the normal speed, then it is possible to calculate the address of the sector to be jumped to with yet a further level of accuracy. By doing this, it is possible to replay the sector to be jumped to in the step S12 with yet a further level of accuracy.

What is claimed is:

1. An optical disk device comprising:
   read means which reads, from an optical disk, audio and video data and a first address of a sector currently being read, the optical disk containing audio and video data recorded at a variable bit rate for each sector and having storage positions of the sectors specified by addresses;
   a buffer memory which sequentially stores the audio and video data read by the read means;
   replay means which sequentially reads out and decodes the audio and video data stored in the buffer memory, and replays the audio and video data;
   actuation means which receives a command for special replay which differs in replay speed from standard replay by the replay means and a designation of replay speed for the special replay; and
   control means which, when the command for the special replay is issued by the actuation means during standard replay, the control means calculates a second address of the sector currently being decoded by the replay means, based upon the first address and upon the amount of data stored in the buffer memory;
   wherein the control means:
      calculates a third address positioned a jump over time period forward from the second address, based upon the second address and upon the jump over time period which corresponds to the replay speed for the special replay designated by the actuation means; and
      commands the read means to read out from the optical disk a sector to be jumped to which is at the third address.

2. The optical disk according to claim 1, wherein, with the first address being termed X (in sectors), the amount of data stored in the buffer memory being termed Y (in bytes), the amount of data per one sector being termed S (in bytes per sector), and the second address being termed Z (in sectors), the control means calculates the second address according to the equation $Z=X-(Y/S)$.

3. The optical disk according to claim 1, wherein the special replay is fast forward replay at a special replay speed which is faster than the speed of standard replay, or reverse replay in the direction opposite to the direction of standard replay, or slow forward replay at a special replay speed which is later than the speed of standard replay.

4. The optical disk according to claim 1, wherein the replay means detects a bit rate of the audio and video data currently being decoded, and the control means calculates the third address based upon the bit rate of the audio and video data currently being decoded which has been detected by the replay means, upon the jump over time period, and upon the calculated second address.

5. The optical disk according to claim 4, wherein, with the bit rate of the audio and video data currently being decoded being termed P (in bits per second), the jump over time period being termed T (in seconds), the amount of data per one sector being termed S (in bytes per sector), the second address being termed Z (in sectors), and the third address being termed Q (in sectors), the control means calculates the third address according to the equation $Q=(P\times T)/(S+Z)$.

* * * * *